United States Patent [19]

Torigai et al.

[11] Patent Number: 4,543,921
[45] Date of Patent: Oct. 1, 1985

[54] MIXTURE-WARMING DEVICE FOR A TWO-STROKE INTERNAL COMBUSTION ENGINE USING A LOWER QUALITY FUEL

[75] Inventors: Katsumi Torigai, Shizuoka; Akio Oka, Hammatsu, both of Japan

[73] Assignee: Sanshin Kogyo Kabushiki Kaisha, Japan

[21] Appl. No.: 534,565

[22] Filed: Sep. 22, 1983

[30] Foreign Application Priority Data

Sep. 29, 1982 [JP] Japan ................. 57-168609
Dec. 28, 1982 [JP] Japan ................. 57-227466
Feb. 23, 1983 [JP] Japan ................. 58-27752

[51] Int. Cl.⁴ ............................................. F02B 33/04
[52] U.S. Cl. .................... 123/73 A; 123/549; 123/145 A
[58] Field of Search ................. 123/73 R, 73 A, 73 B, 123/145 A, 145 R, 179 H, 549

[56] References Cited

U.S. PATENT DOCUMENTS

| | | | |
|---|---|---|---|
| 1,190,592 | 7/1916 | Rorabeck | 123/73 B |
| 1,464,253 | 8/1923 | Wales | 123/549 |
| 1,914,284 | 6/1933 | Palmer | 123/145 A |
| 2,115,657 | 4/1938 | Venediger | 123/73 A |
| 4,162,669 | 7/1979 | Igashira et al. | 123/145 A |
| 4,282,860 | 9/1981 | Fujikawa et al. | 123/73 A |
| 4,345,569 | 8/1982 | Hattori et al. | 123/549 |
| 4,401,090 | 8/1983 | Fujimoto et al. | 123/549 |

FOREIGN PATENT DOCUMENTS

| | | | |
|---|---|---|---|
| 2386684 | 12/1978 | France | 123/73 A |
| 0146272 | 11/1980 | Japan | 123/145 A |
| 0129748 | 10/1981 | Japan | 123/179 H |

Primary Examiner—Ira S. Lazarus
Assistant Examiner—R. E. Bailey
Attorney, Agent, or Firm—Ernest A. Beutler

[57] ABSTRACT

Several embodiments of heating devices for heating the charge of a two-cycle engine before it passes the gap of the spark plug at the time of ignition. The heating devices permit the use of low quality fuel such as kerosene or alcohol without some of the problems normally attendant with engines running on this type of fuel.

9 Claims, 7 Drawing Figures

MIXTURE-WARMING DEVICE FOR A TWO-STROKE INTERNAL COMBUSTION ENGINE USING A LOWER QUALITY FUEL

BACKGROUND OF THE INVENTION

This invention relates to a mixture-warming device for a two-stroke internal combustion engine using a lower quality fuel and more particularly to an improved induction system for two-cycle engines.

It has been proposed to operate two-cycle engines on fuels having lower quality than gasoline. Such alternative fuels as are commonly used are kerosene, alcohol or similar fuels or blends of such fuels. Although such fuels offer acceptable alternatives and permit low cost operation, they do present certain difficulties for starting, acceleration and deceleration. These difficulties result from the fact that the particles of the fuel do not vaporize easily and also, even if they have been vaporized, they may have a tendency to recondense in the engine induction system.

It is, therefore, a principal object of this invention to provide an improved induction system for a two-cycle engine.

It is a further object of this invention to provide a fuel warming arrangement for a two-cycle engine operated on a low quality fuel.

It is a further object of this invention to provide a fuel warming system for a two-cycle engine in which the amount of heat generated will not be sufficient to cause any damaging effects on the engine components.

SUMMARY OF THE INVENTION

This invention is adapted to be embodied in a crankcase compression, two-cycle engine having a piston and cylinder that define a combustion chamber. A crankcase in which a fuel/air charge is compressed upon relatively reciprocation of the piston in the cylinder is supplied with a fuel/air charge. Scavenge passage means transfer the compressed fuel/air charge from the crankcase to the combustion chamber. In accordance with the invention, heating means are interposed in the path of flow taken by the fuel air charge from the crankcase and prior to combustion in the combustion chamber.

DETAILED DESCRIPTION OF THE PREFERRED EMBODIMENTS

Several embodiments of the invention are disclosed. In each embodiment, the basic engine construction is the same. Therefore, the following description of the basic engine construction of the embodiment of FIGS. 1 and 2 should also be considered to be a description of the basic engine of the embodiment of FIGS. 3 and 4, the embodiment of FIG. 5 and the embodiment of FIGS. 6 and 7.

Figure 1:
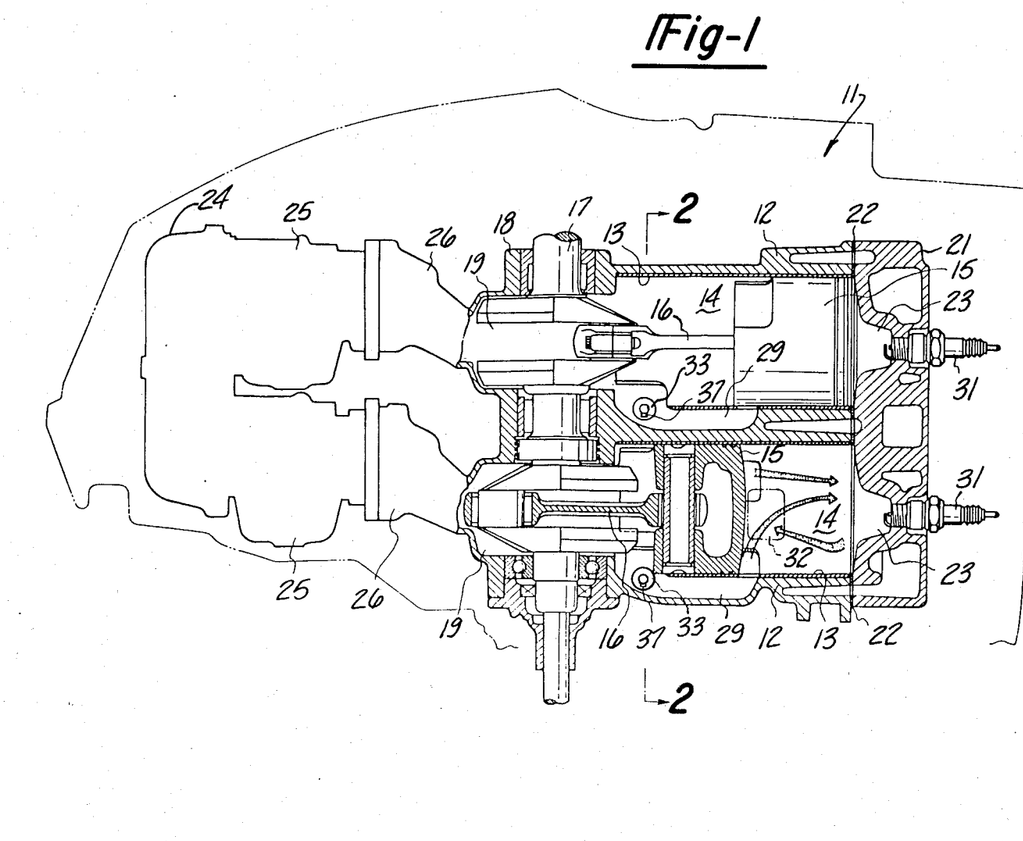
FIG. 1 is a side elevational view, with a portion shown in section, of an outboard motor constructed in accordance with a first embodiment of the invention.
Figure 2:
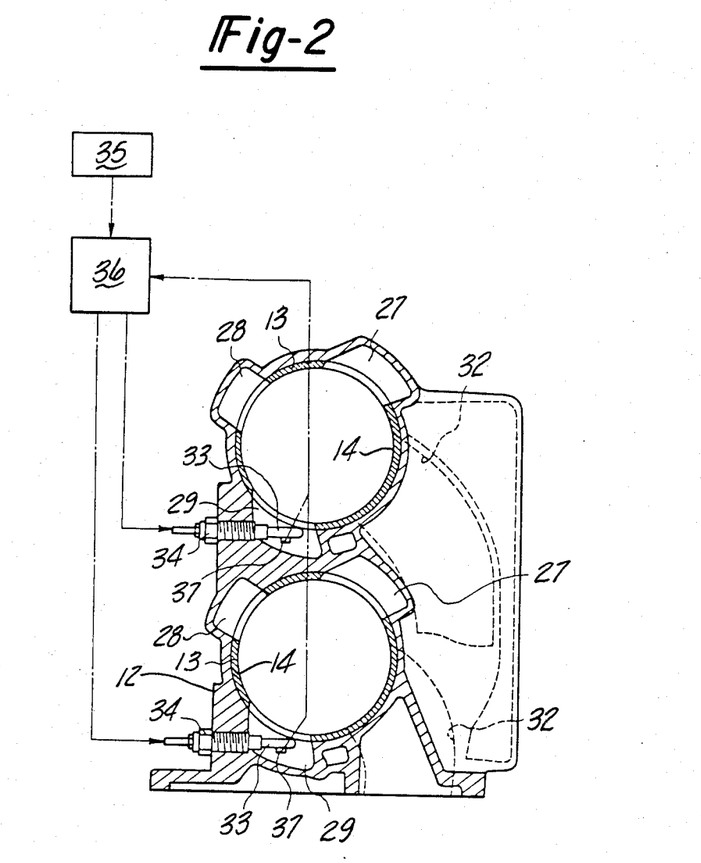
FIG. 2 is a cross-sectional view taken along the line 2—2 of FIG. 1.

Referring now in detail to the embodiment of FIGS. 1 and 2, a motor constructed in accordance with this invention is identified generally by the reference numeral 11. In the illustrated embodiment, the motor 11 is used as an outboard motor and for that reason has its crankshaft disposed vertically. It is to be understood, of course, that the invention is adapted for use with other types of motors and for motors employed for other purposes than outboard motors.

The motor 11 includes a cylinder block 12 in which a pair of vertically disposed, horizontally extending cylinder liners 13 are provided. The cylinder liners 13 form respective cylinder bores 14 in which pistons 15 are supported for reciprocation. The pistons 15 are connected by means of connecting rods 16 to a crankshaft 17. The crankshaft 17 is rotatably supported about a vertical axis by suitable bearings between the cylinder block 12 and a crankcase 18 that is affixed in a known manner to the cylinder block 12. The crankcase 18 and cylinder block 12 define a plurality of crankcase chambers 19 which are sealed from each other and to which a fuel/air mixture is admitted, in a manner to be described.

A cylinder head 21 is affixed to the cylinder block 12 with a head gasket 22 being interposed therebetween for sealing purposes. The cylinder head 21 is formed with recesses 23 that align with the respective cylinder bores 14 and which form, with the cylinder bores 14 and pistons 15, chambers that vary in volume during the reciprocation of the pistons 15. The recesses 23 may at times be referred to hereinafter as the "combustion chambers" since at top dead center position of the pistons 15, these recesses do define the combustion chambers.

The induction system for the engine 11 includes an air inlet device 24 that supplies air to a pair of carburetors 25. Each carburetor 25 discharges a fuel/air mixture to a respective one of the crankcase chambers 29 through an intake manifold runner 26. Reed type check valves (not shown) are positioned in the manifold runners 26 so as to preclude reverse flow from the crankcase chambers 19 back to the carburetors 25. In accordance with the invention, the engine 11 is adapted to operate on a low quality fuel such as kerosene or alcohol or the like. Therefore, this is the fuel that is supplied to the carburetors 25.

As is well known with this type of engine, the intake charge is compressed in the chambers 19 when the pistons 15 are moving downwardly. A plurality of scavenge passages 27, 28 and 29 (FIG. 2) extend from each crankcase chamber 19 through the cylinder block 12 and terminate in discharge ports in the cylinder liners 13. The fuel/air charge compressed in the crankcase chambers 19 is delivered to the combustion chambers 23 through the scavenge passages 27, 28 and 29. The passages 27, 28 and 29 are oriented so that the air and fuel introduced into the combustion chamber will follow a loop type pattern upwardly along one side of the cylinder wall, into the cylinder head recesses 23 and then downwardly as shown by the arrows in FIG. 1. In order to fire the charge, spark plugs 31 are supported in the cylinder head recesses 23 and are fired in a known manner. The burnt charge is then exhausted through exhaust ports and passages 32 formed in the cylinder line 13 and cylinder block 12.

The portion of the engine 11 thus far described may be considered to be conventional in construction. Also, as has been noted above, the description of the components thus far is equally applicable to the embodiment of FIGS. 3 and 4, the embodiment of FIG. 5, and the embodiment of FIGS. 6 and 7. For this reason, these components have been identified by the same reference numerals in connection with these other embodiments and the description of these components will not be repeated in describing those embodiments, except insofar as is necessary to understand their operation.

Because of the relatively low quality of the fuel employed in the engine 11, there is a liklihood of fuel condensation in the crankcase chambers 19, in the scavenge passages 27, 28 and 29 and also in the combustion chambers 23, particularly at low speeds and low temperatures. Such condensation can cause poor fuel economy, poor starting, bad acceleration and deceleration and unstable running at low speeds. This results from alternately lean and rich mixtures with the lean periods being caused by the condensation of the rich periods being caused when the condensed fuel is transferred as large particles into the combustion chambers 23.

In accordance with the embodiments of the invention, a heating device is interposed in the path of fuel-/air flow from the crankcase chambers 19 to the gaps of the spark plugs 31 prior to ignition. In the embodiment of FIGS. 1 and 2, the heating device comprises a glow plug 33 that is positioned in one of the scavenge passages and preferably in the lowermost one 29 immediately adjacent the area where the scavenge passage 29 opens into the respective crankcase chamber 19. As a result, the charge transferred from the crankcase chamber 19 into the scavenge passagway 29 will flow across the glow plug 33 and immediately be heated. This heating will insure against condensation and also will cause vaporization of any large particles of fuel which may have already condensed.

The glow plugs 33 have base portions 34 that are threaded into suitable apertures in the cylinder block 12 and are heated by means of control circuits shown schematically in FIG. 2 from an electrical source 35. The electrical source 35 is in circuit with a controller 36 that receives a signal from a thermocouple 37 which is carried by the tip of each glow plug 33 so as to insure that the temperature of the glow plugs 33 will not be so high as to cause any problems due to overheating.

Figure 3:
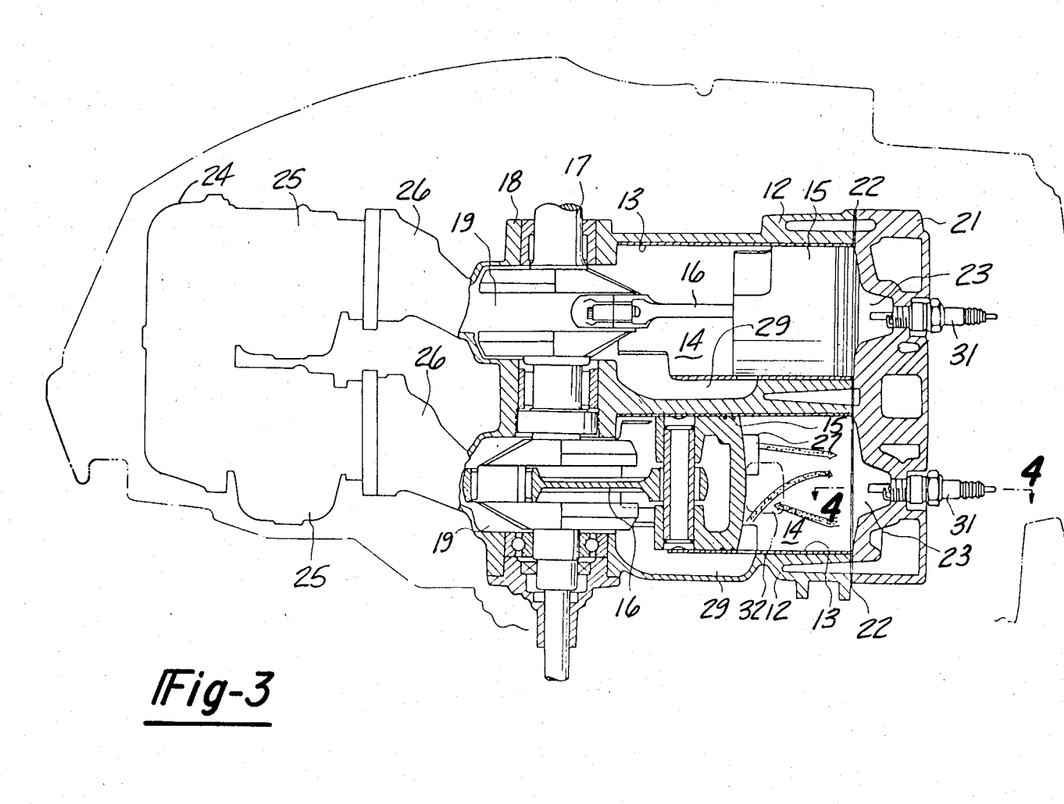
FIG. 3 is a side elevational view, with a portion broken away, in part similar to FIG. 1 and shows a second embodiment of the invention.
Figure 4:
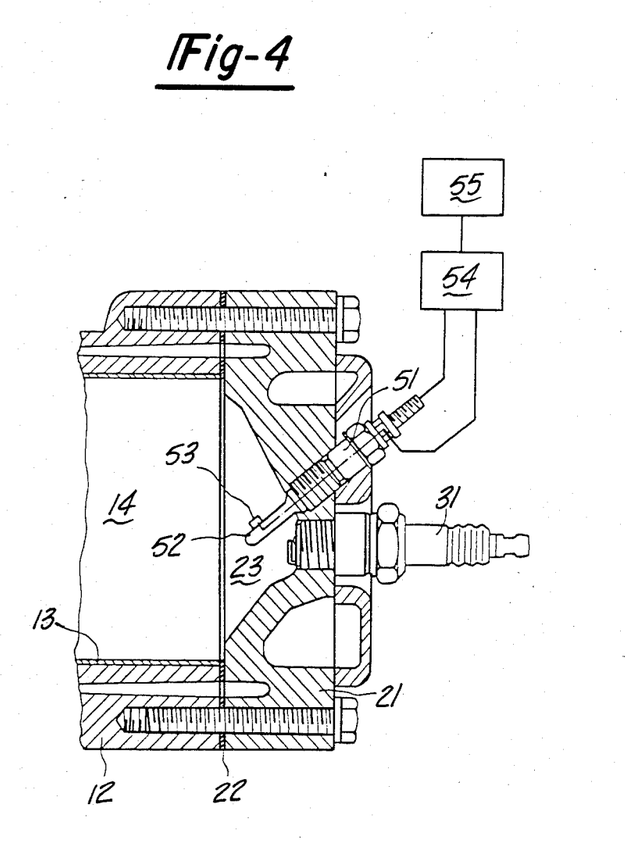
FIG. 4 is an enlarged cross-sectional view taken along the line 4—4 of FIG. 3.

Referring now to the embodiment of FIGS. 3 and 4, a glow plug 51 is supported in the cylinder head 21 for each cylinder. The glow plug 51 has an extending tip portion 52 which is heated and which is disposed in the cylinder head recess 23 in proximity to the gap of the spark plug 31. The heating portion 52 is disposed so that the fuel/air mixture transferred into the chamber 23 from the scavenge passages 27, 28 and 29 will flow across it before they reach the gap of the spark plug 31. Hence, any condensed particles will be revaporized before ignition of the plug 31.

A thermocouple 53 is positioned adjacent the heating portion 52 and is in circuit with a control device 54 that controls the source of electricity from a source 55 so as to maintain a uniform temperature in the heating portion 52 and one which will not be too high.

Figure 5:
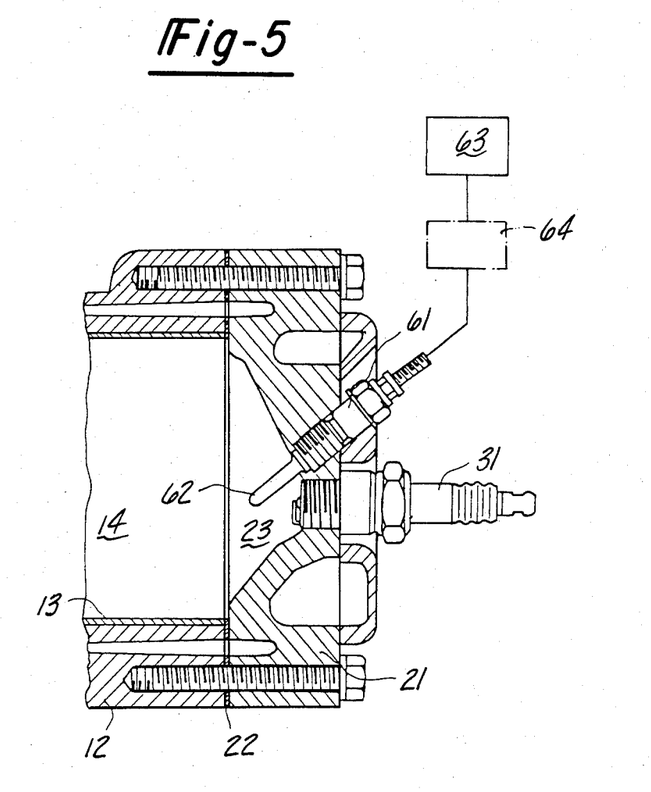
FIG. 5 is a cross-sectional view, in part similar to FIG. 4, showing another embodiment of the invention.

FIG. 5 shows another embodiment of the invention that is generally similar to the embodiment of FIGS. 3 and 4. In accordance with his embodiment, a glow plug 61 is positioned in the cylinder head 21 and has a heating tip 62 that extends into the cylinder head recess 23 adjacent the gap of the spark plug 31 and upstream of the spark plug gap in the direction of fuel/air charge flow in the combustion chamber. In accordance with this embodiment, an alternating current electrical source 63 is provided which supplies power to the glow plug 61 through a constant voltage circuit 64 so as to eliminate the necessity for a thermocouple. In accordance with this embodiment, the constant voltage circuit 64 insures that the glow plug tip 62 will not be heated excessively.

Figure 6:
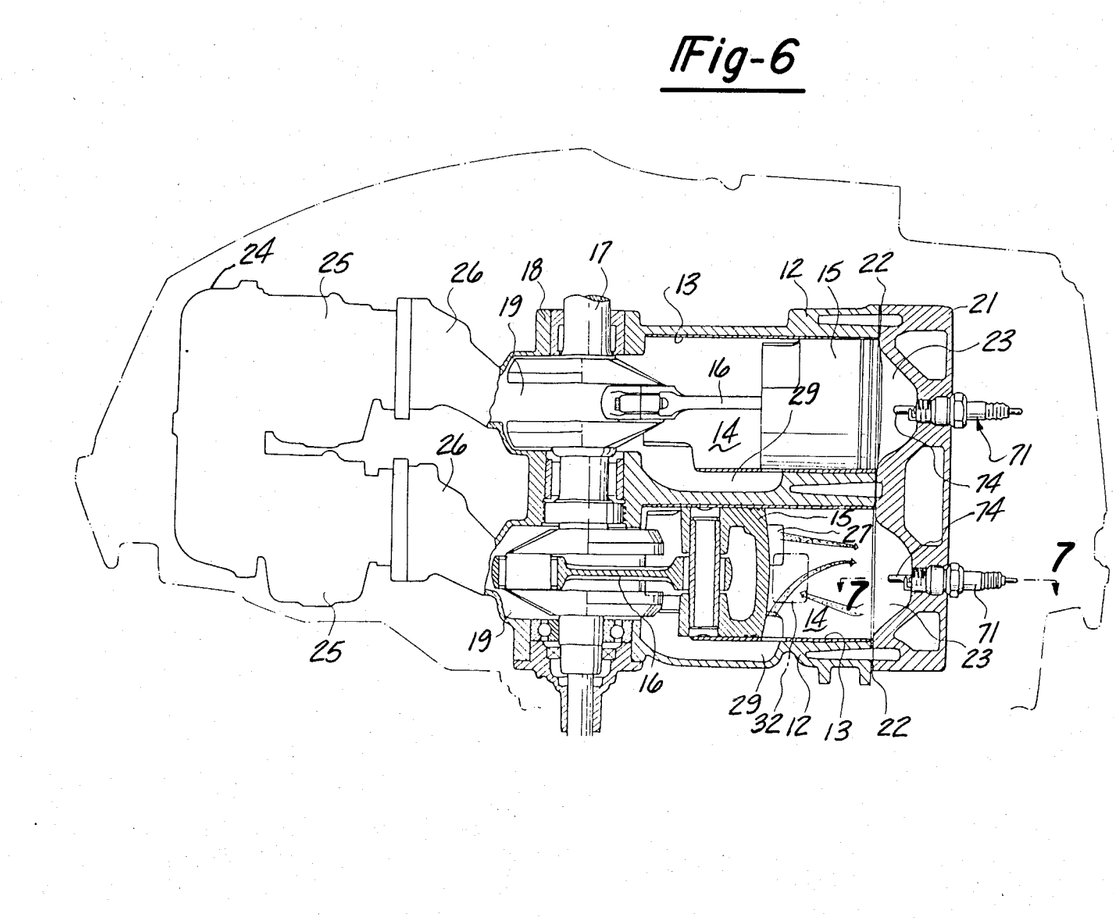
FIG. 6 is a side elevational view, with a portion broken away, in part similar to FIGS. 1 and 3 and shows a fourth embodiment of the invention.
Figure 7:
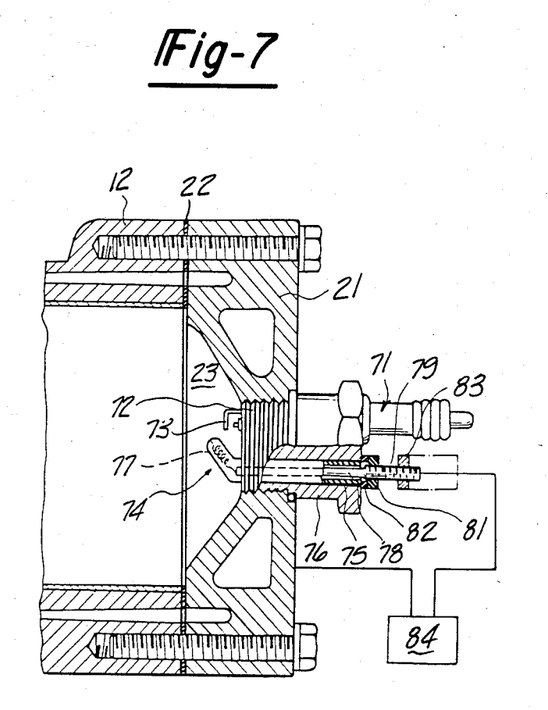
FIG. 7 is an enlarged cross-sectional view taken along the line 7—7 of FIG. 6.

FIGS. 6 and 7 show a still further embodiment of this invention. In this embodiment, a combined spark plug glow plug, indicated generally by the reference numeral 71 is provided for each cylinder head recess 23. The combined spark plug glow plug 71 has a threaded portion 72 that threads into a suitable opening in the cylinder head 21 in proximity to the recess 23. A pair of conventional plug terminals 73 are positioned within the threaded portion 72 in a known manner.

A glow plug portion 74 has a generally tubular part 75 that extends through a body 76 of the spark plug and which projects at its lower end in proximity to the spark gap 73. An electrical heating coil 77 is contained within this projecting portion so as to heat the fuel/air charge transferred from the scavenge ports to the combustion chamber before it reaches the plug gap 73. A conductor 78 extends from the heating portion 77 through the housing 75 and has an exposed end 79 that is threaded so as to receive a nut 81 that holds an insulating washer 82 relative to the plug body 76. A connector 83 is also snapped onto the threaded end 79 so as to complete an electrical circuit with a suitable electrical source 84. As in the previously described embodiments, the source 84 may include a constant voltage supply for limiting the heat generated by the heating element 77 or, alternatively, a thermocouple control may be incorporated so as to insure against overheating.

It should be readily apparent that the described embodiments all permit the use of low quality fuels without some of the starting, acceleration, decleration and low speed stability common to engines running on such fuels. These defects are achieved by heating the fuel/air mixture prior to ignition so as to insure vaporization of the particles and to avoid condensation. Although several embodiments have been illustrated and described, it is believed to be readily apparent that other forms of the invention may present themselves to those skilled in the art without departing from the spirit and scope of the invention, as defined by the appended claims.

We claim:

1. In a crankcase compression two-cycle engine having a piston and cylinder defining a combustion chamber, a crankcase in which a fuel/air charge is compressed upon relative reciprocation of said piston and said cylinder, means for forming a fuel/air charge in said crankcase, a spark plug in said combustion chamber for firing a fuel/air charge therein and scavenge passage means for transferring a compressed fuel/air charge from said crankcase to said combustion chamber, the improvement comprising heating means interposed directly in the path of flow taken by the fuel/air charge from said crankcase between the means for forming the fuel/air charge and spark plug for heating the fuel/air charge prior to combustion in said combustion chamber.

2. In a crankcase compression two-cycle engine as set forth in claim 1 wherein the heating device is positioned in the combustion chamber.

3. In a crankcase compression two-cycle engine as set forth in claim 2 wherein the heating device and spark plug comprise a single element.

4. In a crankcase compression two-cycle engine as set forth in claim 3 further including temperature responsive control means for limiting the heat generated by the heating means.

5. In a crankcase compression two-cycle engine as set forth in claim 2 further including temperature responsive control means for limiting the heat generated by the heating means.

6. In a crankcase compression two-cycle engine as set forth in claim 1 wherein the heating device is positioned within the scavenge passage.

7. In a crankcase compression two-cycle engine as set forth in claim 6 further including temperature responsive control means for limiting the heat generated by the heating means.

8. In a crankcase compression two-cycle engine as set forth in claim 6 wherein there are a plurality of scavenge passages and the heating means is positioned in the lowermost of the scavenge passages.

9. In a crankcase compression two-cycle engine as set forth in claim 1 further including temperature responsive control means for limiting the heat generated by the heating means.

* * * * *